(12) United States Patent
Yoshida

(10) Patent No.: US 6,414,965 B1
(45) Date of Patent: Jul. 2, 2002

(54) DATA COMMUNICATION APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/433,560

(22) Filed: Nov. 4, 1999

(30) Foreign Application Priority Data

Nov. 6, 1998 (JP) .......................................... 10-315666

(51) Int. Cl.[7] ................................................. H04J 3/24
(52) U.S. Cl. ..................................................... 370/449
(58) Field of Search ............................... 370/449, 282, 370/462, 318–320; 318/320, 335; 340/10.3–10.41, 573.4, 539; 375/230–235; 455/524, 429–431; 429/100; 430/509–517; 358/434–441, 400; 379/100, 38

(56) References Cited

U.S. PATENT DOCUMENTS

| | | | | |
|---|---|---|---|---|
| 4,685,149 A | * | 8/1987 | Smith et al. ................. | 455/524 |
| 5,563,883 A | * | 10/1996 | Cheng .......................... | 370/449 |
| 6,091,766 A | * | 7/2000 | Yoshida ....................... | 375/231 |
| 6,281,987 B1 | * | 8/2001 | Yoshida ....................... | 358/434 |

* cited by examiner

*Primary Examiner*—Kwang Bin Yao
*Assistant Examiner*—Prenell Jones
(74) *Attorney, Agent, or Firm*—Fitzpatrick, Cella, Harper & Scinto

(57) ABSTRACT

An effective operation method is provided for multi-polling communication in which a plurality of SEP signals are designated in one communication process during polling receiving. A plurality of SEP data are received before one communication process on the basis of input operation using an SEP data input button. SEP data are continuously received during execution of polling receiving. If input of SEP data is selected at the end of currently executed polling receiving, a call is released once, and then a call is made to the same destination to execute polling receiving. During execution of multi-polling receiving, a display circuit displays a plurality of designated SEP data. In addition, if input of the same SEP data is selected during one communication process, a display circuit displays to warn this fact.

16 Claims, 5 Drawing Sheets

DATA COMMUNICATION APPARATUS

BACKGROUND OF THE INVENTION

1. Field of the Invention

The present invention relates to a data communication apparatus capable of multi-polling communication by inputting a plurality of SEP (selective polling) data in one communication process.

2. Related Background Art

According to a conventional polling receiving scheme using SEP signals, one SEP signal can be designated in one communication process.

In the above conventional scheme, however, a plurality of SEP signals cannot be designated in one communication process during polling receiving.

In contrast to this, the present applicant has proposed a data communication system capable of multi-polling communication in which a plurality of SEP signals can be designated in one communication process during polling receiving (U.S. patent application Ser. No. 09/149,275).

SUMMARY OF THE INVENTION

It is an object of the present invention to provide a data communication apparatus capable of easy multi-polling communication by effective operation.

In order to achieve the above object, according to the present invention, there is provided a data communication apparatus capable of multi-polling communication, which can designate a plurality of SEP signals in one communication process during polling receiving, comprising input means for inputting a plurality of SEP data for multi-polling receiving, wherein the input means can input a plurality of SEP data before one communication process, and can add input SEP data during execution of polling receiving based on the input SEP data, and execute polling receiving based on the added SEP data.

DETAILED DESCRIPTION OF THE PREFERRED EMBODIMENTS

Figure 1:
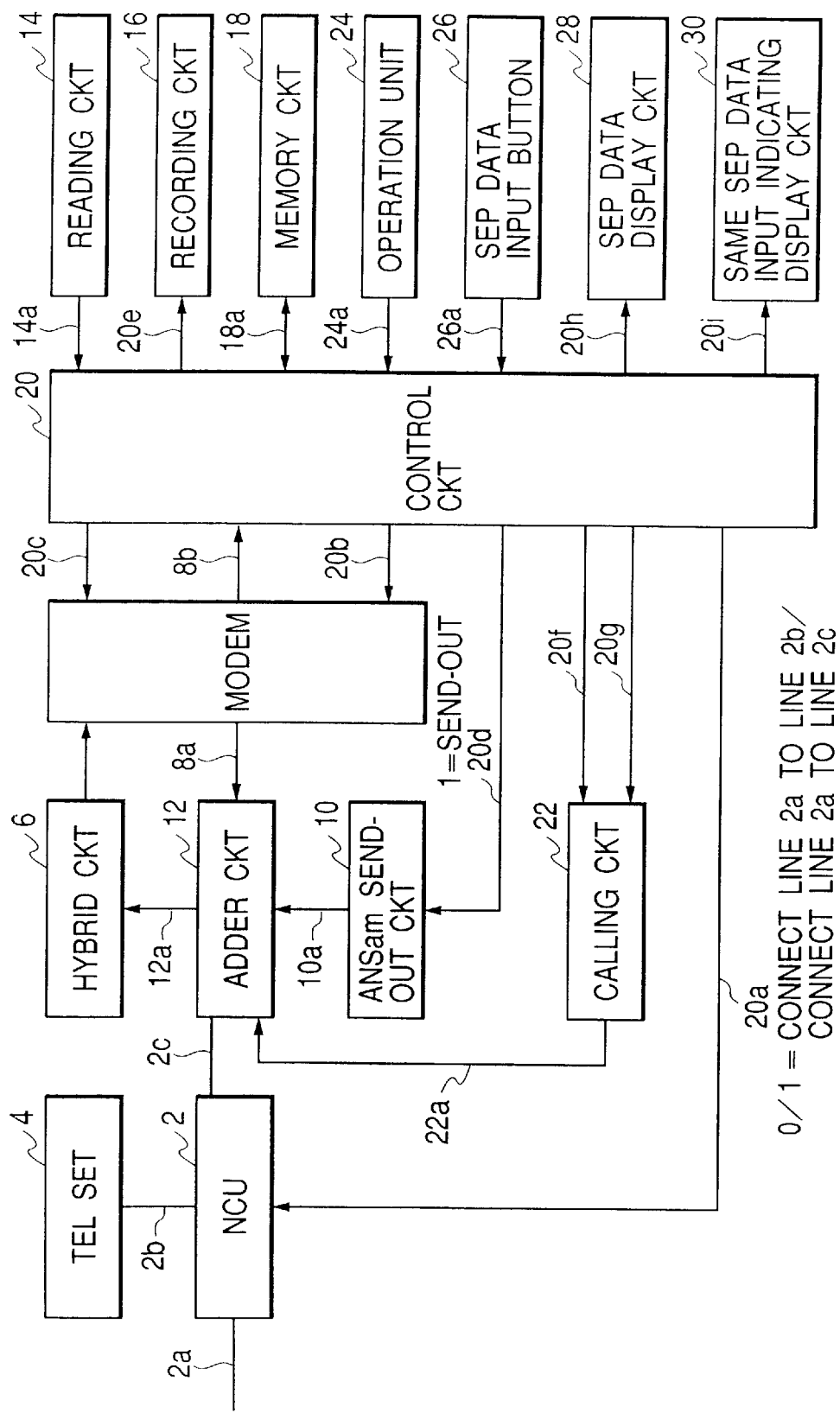
FIG. 1 is a block diagram showing an embodiment of the present invention.

FIG. 1 is a block diagram showing the arrangement of a facsimile apparatus according to an embodiment of the present invention.

An NCU (network control unit) 2 is connected to a terminal connected to a line of a telephone network to perform connection control on the telephone switched network, perform switching to a data communication path, and maintain a loop, thereby using the telephone network for data communication and the like. If the signal level (signal line 20a) from a control circuit 20 is "0", the NCU 2 connects a telephone line 2a to a telephone set 4. If the signal level is "1", the NCU 2 connects the telephone line 2a to a facsimile apparatus. In a normal state, the telephone line 2a is connected to the telephone set 4.

A hybrid circuit 6 separates signals for the transmission system from signals for the reception signals. The hybrid circuit 6 sends out a transmission signal from an adder circuit 12 to the telephone line 2a through the NCU 2. The hybrid circuit 6 receives a signal from the partner through the NCU 2 and sends the signal to a modem 8 through a signal line 6a.

The modem 8 modulates and demodulates based on ITU-T recommendations V.8, V.21, V.27 ter, V.29, V.17, and V.34. Various transmission modes are designated for the modem 8 through a signal line 20c. The modem 8 receives the signal output to a signal line 20b and outputs modulated data to a signal line 8a. The modem 8 also receives the reception signal output to the signal line 6a and outputs demodulated data to a signal line 8b.

An ANSam send-out circuit 10 is a circuit for sending out an ANSam signal. When a signal of signal level "1" is output to a signal line 20d, the ANSam send-out circuit 10 sends out the ANSam signal to a signal line 10a. When a signal of signal level "0" is output to the signal line 20d, the ANSam send-out circuit 10 sends out no signal to the signal line 10a.

The adder circuit 12 receives pieces of information through the signal line 8a, the signal line 10a, and a signal line 22a and outputs the addition result to a signal line 12a. A reading circuit 14 reads an original image and outputs the read image data to a signal line 14a. A recording circuit 16 sequentially records the information output to a signal line 20e in units of lines.

A memory circuit 18 is used to store raw information of the read data, coded information, received information, decoded information, and the like.

A calling circuit 22 receives the telephone number information output to a signal line 20g and outputs a DTMF selection signal to the signal line 22a when a calling command pulse is generated on a signal line 20f.

An operation unit 24 has a one-touch dialing key, abbreviated dialing key, ten-key pad, "*·#" key, set key, start key, stop key, other function keys, and the like. Key information corresponding to a pressed key is output to a signal line 24a.

An SEP data input button 26 is pressed to execute polling receiving with information to be polled on the partner being designated by SEP data. When this button 26 is pressed, a press pulse is generated at a signal line 26a.

A display circuit 28 is a circuit for displaying SEP data for multi-polling. The display circuit 28 displays SEP data designated in one multi-polling receiving process. The display circuit 28 receives information through a signal line 20h and sequentially displays the output SEP data.

A display circuit 30 is a circuit for displaying information indicating that the same SEP data has already been designated. The display circuit 30 displays this information when the same SEP data is designated in one multi-polling receiving process. The display circuit 30 displays while a signal of signal level "1" is output to a signal line 20i, but displays no information while a signal of signal level "0" is output to the signal line 20i.

The control circuit 20 controls the overall facsimile apparatus. In this embodiment, in particular, the control circuit 20 performs control associated with multi-polling receiving, i.e., polling receiving in which a plurality of SEP signals are designated in one communication process.

More specifically, the control circuit 20 receives and processes a plurality of SEP data prior to one communication process on the basis of the input obtained by pressing the SEP data input button 26. In addition, during reservation of polling receiving based on SEP data, the control circuit 20 continuously receives SEP data and adds the SEP data. Furthermore, the control circuit 20 receives SEP data during polling receiving and adds the SEP data.

If inputting of SEP data is selected at the end of currently executed polling receiving, the control circuit 20 calls the same designated destination and performs control to execute polling receiving. At this time, the same destination is automatically called even if the user inputs no destination information.

During multi-polling receiving, the control circuit 20 causes the display circuit 28 to display a plurality of designated SEP data. If the same SEP data is input in one communication process, the control circuit 20 controls the display circuit 30 to display the corresponding information.

FIGS. 2 to 5 are flow charts showing the flow of control performed by the control circuit 20 in this embodiment.

Figure 2:
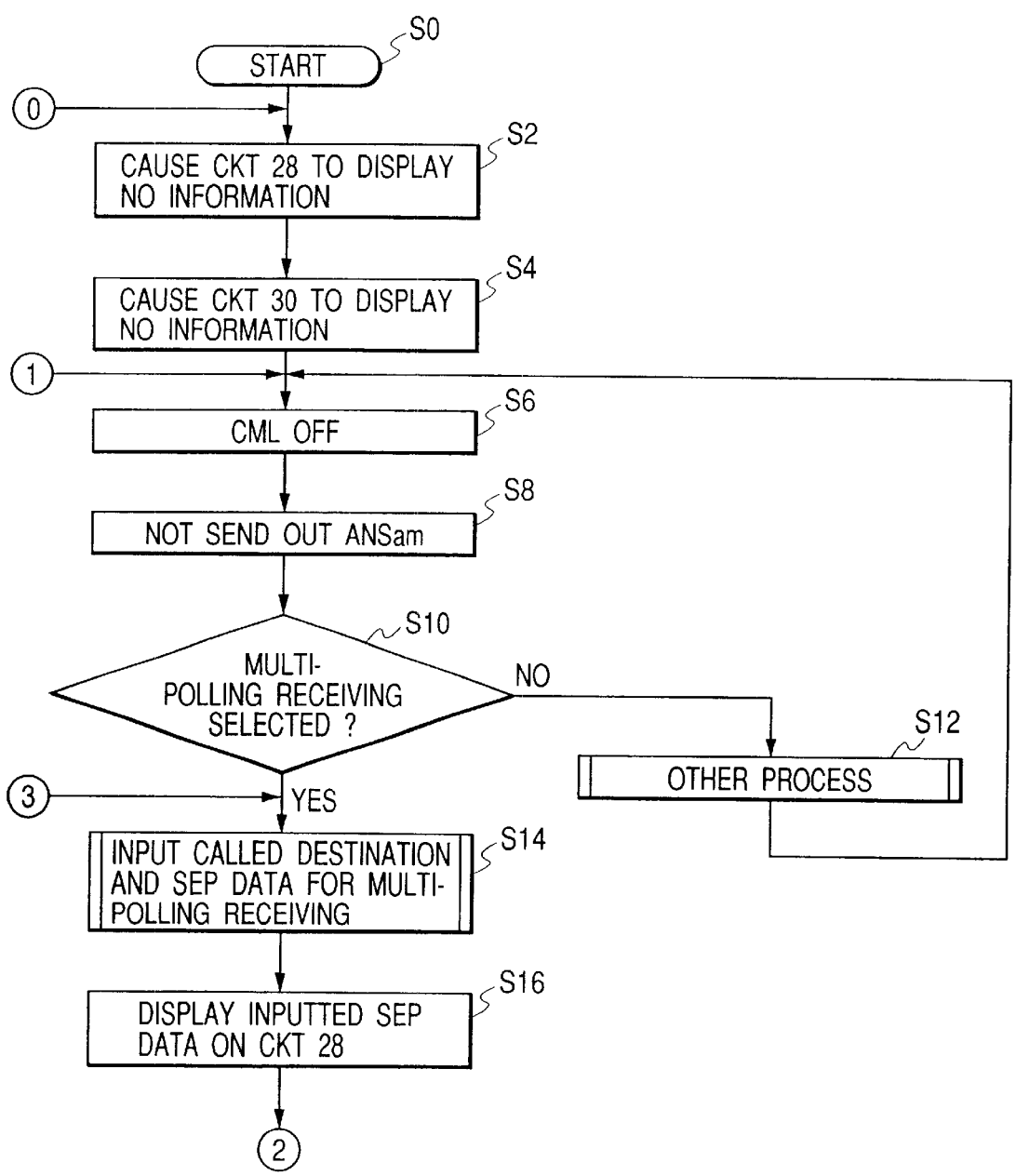
FIG. 2 is a flow chart showing the operation of the embodiment.
Figure 3:
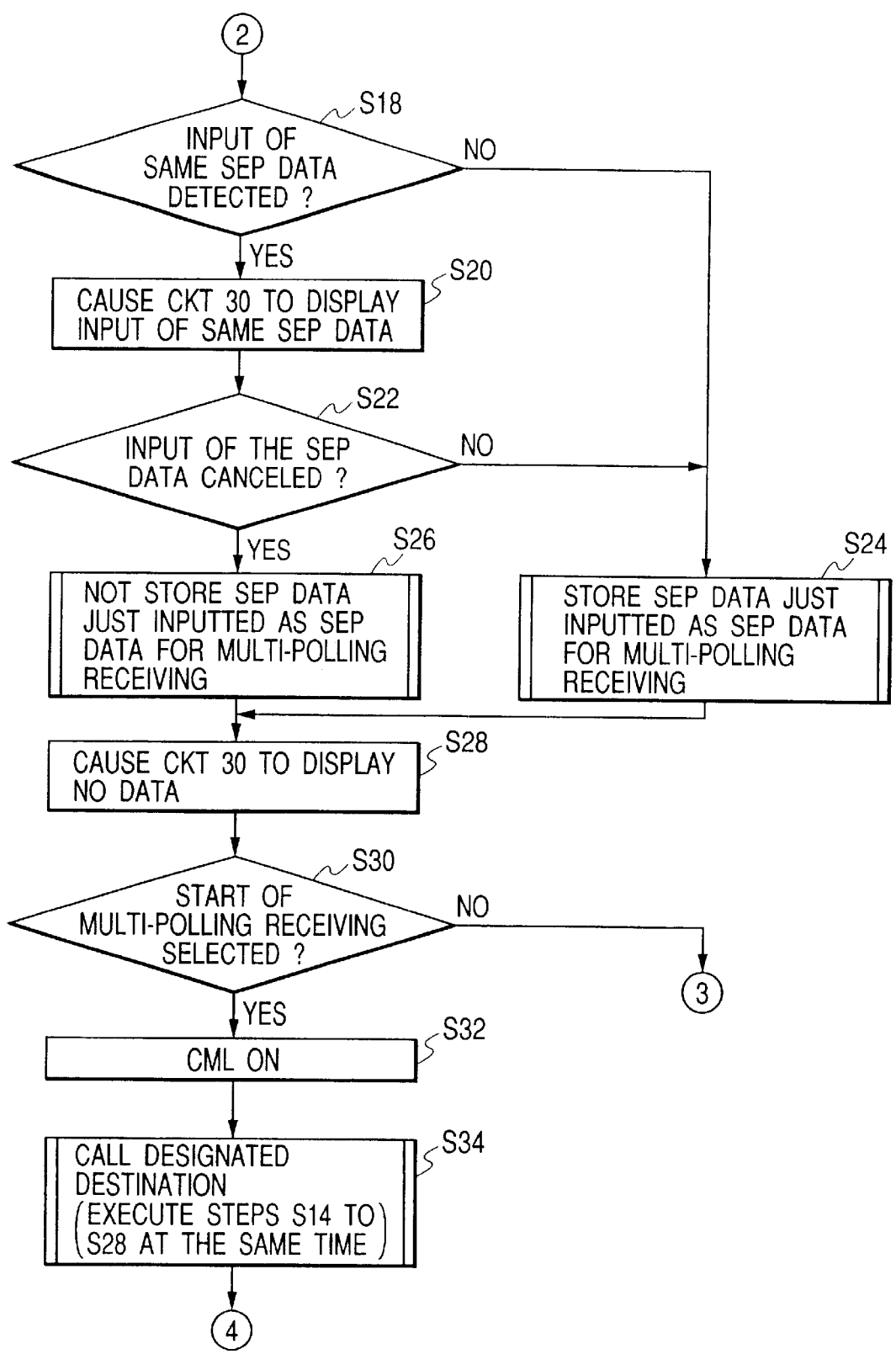
FIG. 3 is a flow chart showing the operation of the embodiment.
Figure 4:
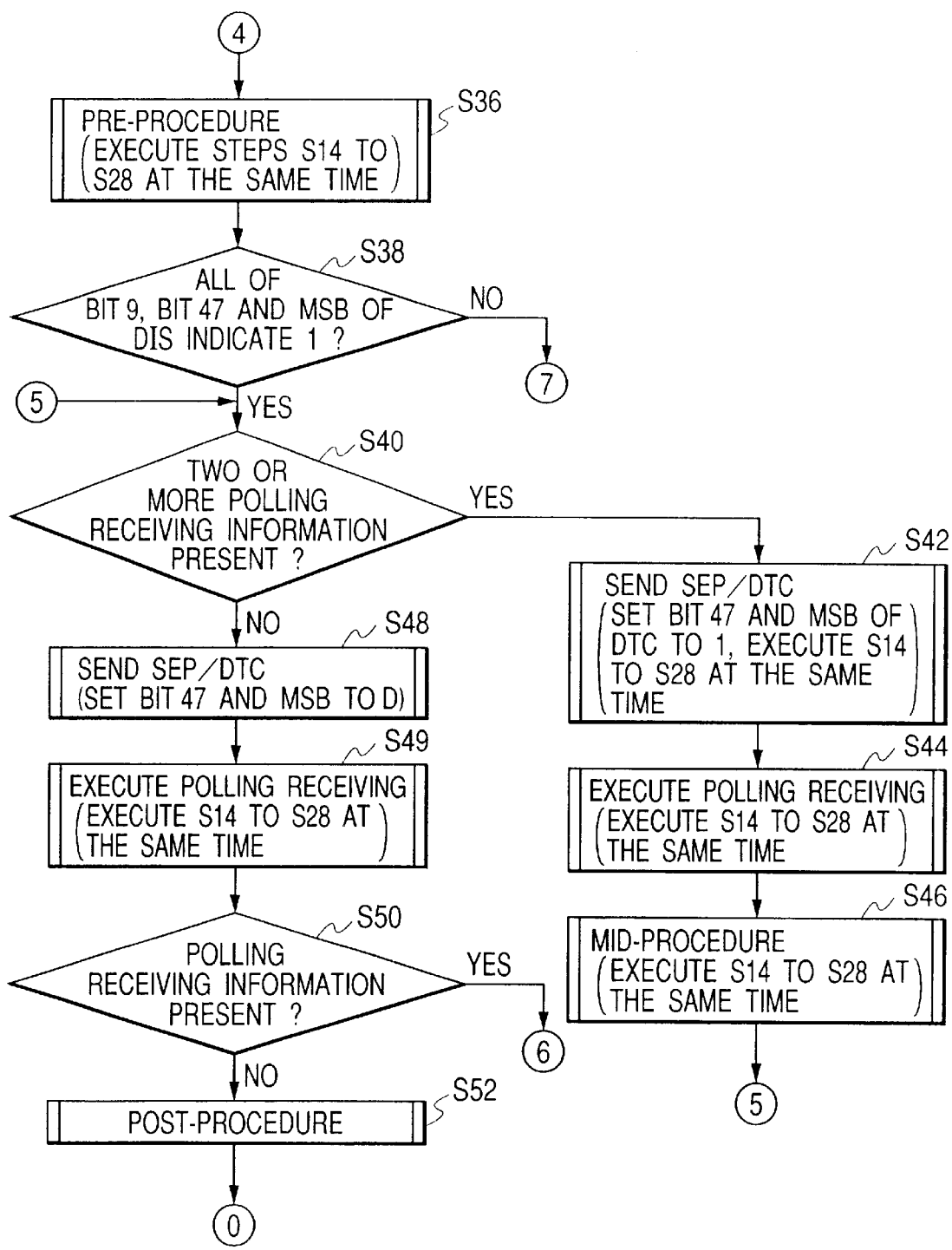
FIG. 4 is a flow chart showing the operation of the embodiment.
Figure 5:
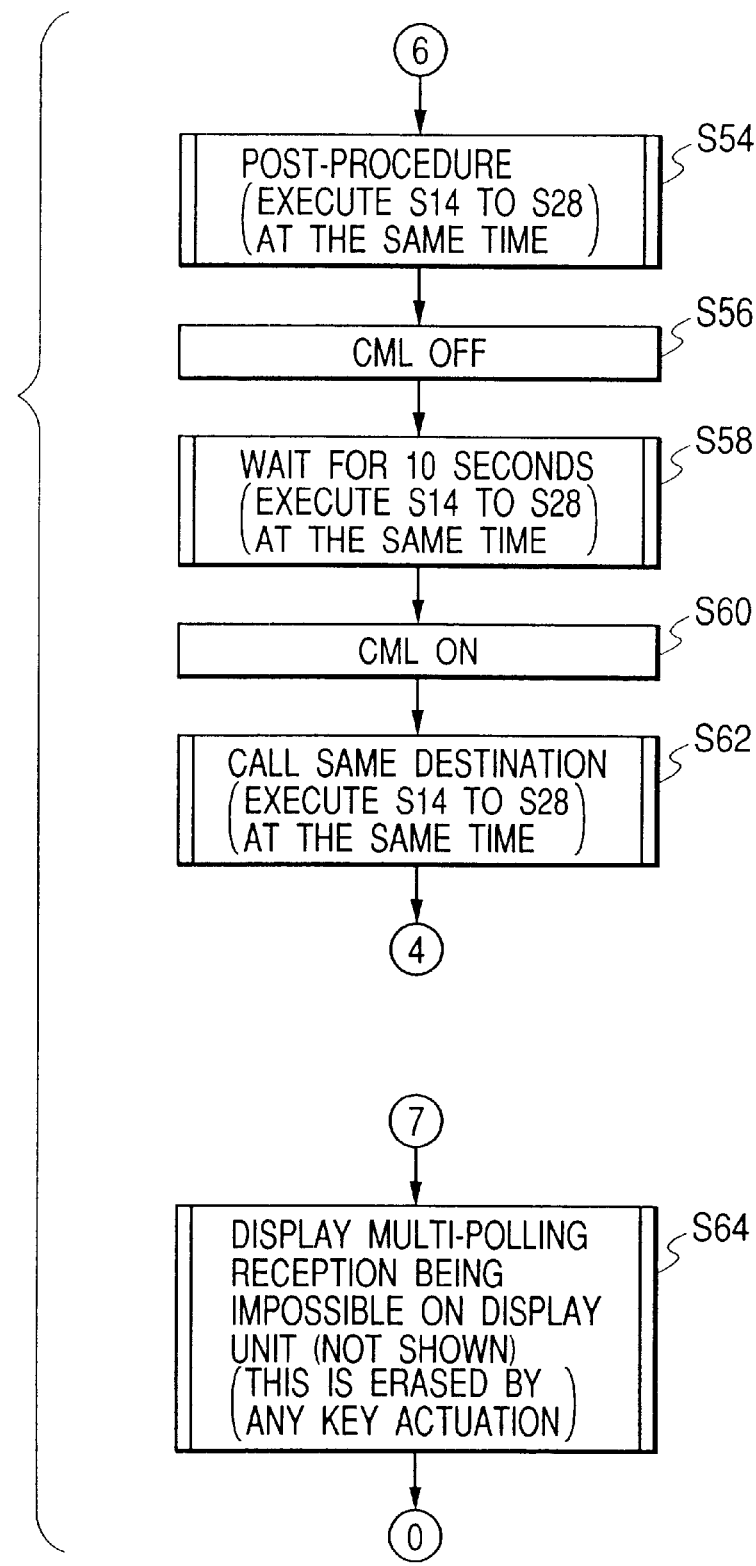
FIG. 5 is a flow chart showing the operation of the embodiment.

Referring to FIG. 2, the control circuit 20 starts operation in step S0. In step S2, the control circuit 20 causes the SEP data display circuit 28 to display no information through the signal line 20h. In step S4, the control circuit 20 outputs a signal of signal level "0" to the signal line 20i and causes the SEP data display circuit 30 to display no information.

In step S6, the control circuit 20 outputs signal of signal level "0" to the signal line 20g to turn off the CML. In step S8, the control circuit 20 outputs a signal of signal level "0" to the signal line 20d and transmits no ANSam signal.

In step S10, the control circuit 20 receives pieces of information through the signal lines 24a and 26a and checks whether multi-polling receiving is selected. If YES in step S10, the flow advances to step S14. If NO in step S10, the flow advances to step S12 to perform other processes.

In step S14, the control circuit 20 receives pieces of information through the signal lines 24a and 26a to receive a called destination and SEP data for multi-polling receiving. In step S16, the control circuit 20 displays the received SEP data on the multi-polling SEP data display circuit 28 through the signal line 20h.

In step S18, the control circuit 20 selects input of SEP data and checks whether input of the same SEP data as the SEP data that has already been input is detected in this polling receiving operation. If NO in step S18, the flow advances to step S24.

If YES in step S18, the flow advances to step S20 to output a signal of signal level "1" to the signal line 20i and cause the display circuit 30 to display information indicating that the same SEP data has already been designated. The flow then advances to step S22.

In step S22, the control circuit 20 receives information through the signal line 24a and checks whether input of the currently received SEP data is canceled. If NO in step S22, the flow advances to step S24. If YES in step S22, the flow advances to step S26.

In step S24, the control circuit 20 stores the currently received SEP data as SEP data for multi-polling receiving. In step S26, the display circuit 30 does not store the currently received SEP data as SEP data for multi-polling receiving.

In step S28, the control circuit 20 outputs a signal of signal level "0" to the signal line 20i to cause the display circuit 30 to display no information indicating that the same SEP data has already been designated. In step S30, the control circuit 20 receives pieces of information through the signal lines 24a and 26a and checks whether the start of multi-polling receiving is selected. If YES in step S30, the flow advances to step S32. If NO in step S30, the flow advances to step S14.

In step S32, the control circuit 20 outputs a signal of signal level "1" to the signal line 20a to turn on the CML. In step S34, the control circuit 20 causes the calling circuit 22 to call the designated destination. At the same time, the control circuit 20 executes control operation in steps S14 to S28. In step S36, the control circuit 20 executes a pre-procedure. At the same time, the control circuit 20 executes control operation in steps S14 to S28.

In step S38, the control circuit 20 checks whether all of bit 9, bit 47, and MSB of FIF of a DIS signal indicate 1. In this case, bit 9 represents the presence/absence of a transmission original; bit 47, the presence of a SEP signal receiving function; and MSB, the presence of a multi-polling transmitting function. If all of these bits indicate 1, the flow advances to step S40. If any one of the bits indicates 0, the flow advances to step S64.

In step S40, the control circuit 20 checks whether two or more polling receiving data are present (SEP data are input). If YES in step S40, the flow advances to step S42. If NO in step S40, the flow advances to step S48.

In step S42, the control circuit 20 sends a SEP/DTC signal. In this case, the control circuit 20 sets bit 47 (representing the execution of transmission of a SEP signal) and MSB (representing the execution of polling receiving of at least one more data) of the DTC signal to 1. At the same time, the control circuit 20 executes control operation in steps S14 to S28.

In step S44, the control circuit 20 executes polling receiving. At the same time, the control circuit 20 executes control operation in steps S14 to S28. In step S46, the control circuit 20 performs a mid-procedure. At the same time, the control circuit 20 executes control operation in steps S14 to S28. The flow then advances to step S40.

In step S48, the control circuit 20 sends the SEP/DTC signal. In this case, the control circuit 20 sets bit 47 and MSB of the DTC signal to 1 and 0, respectively. At the same time, the control circuit 20 executes control operation in steps S14 to S28. In step S49, the control circuit 20 executes polling receiving. At the same time, the control circuit 20 executes control operation in steps S14 to S28.

In step S50, the control circuit 20 checks whether polling receiving data is present (SEP data is input). If YES in step S50, the flow advances to step S54. If NO in step S50, the flow advances to step S52 to execute a post-procedure. In step S52, the control circuit 20 does not execute control operation in steps S14 to S28. Thereafter, the flow advances to step S2.

In step S54, the control circuit 20 executes the post-procedure. At the same time, the control circuit 20 executes control operation in steps S14 to S28. In step S56, the control circuit 20 outputs a signal of signal level "0" to the signal line 20a to turn off the CML.

In step S58, the control circuit 20 waits for 10 sec. At the same time, the control circuit 20 executes control operation in steps S14 to S28. In step S60, the control circuit 20 outputs a signal of signal level "1" to the signal line 20a to turn on the CML. In step S62, the control circuit 20 causes the calling circuit 22 to call the same destination. At the same time, the control circuit 20 executes control operation in steps S14 to S28. The flow then advances to step S36.

In step S64, the control circuit 20 displays information indicating an inability to perform multi-polling receiving on a display unit (not shown). This displayed information is cleared by some key operation. Thereafter, the flow advances to step S2.

According to the above description, the CPU in the control circuit performs the above operation of the control circuit in accordance with the program stored in the ROM, RAM, or the like in the control circuit. The objects of the present invention are also achieved by storing such a program in a floppy disk, hard disk, optical disk, CD-ROM, or external storage medium such as a memory card, causing a dedicated reading unit to load the program into the control circuit, and causing the CPU in the control circuit to execute the program.

In the above embodiment, the facsimile apparatus of the standalone type has been exemplified. However, the present invention is not limited to this. For example, the present invention can be applied to data communication control in a multi-functional data processing system that combines a communication function with a copying function, electronic filing function, and data processing function. The present invention can also be applied to a communication apparatus separated from a reading circuit and recording circuit.

As has been described above, according to the present invention, there is provided an easy-to-use multi-polling system which allows an operator who has selected multi-polling receiving to additionally perform polling receiving based on SEP data before the start of communication and at any timing during communication (polling receiving).

According to the present invention, there is provided an easy-to-use multi-polling system which allows an operator who has selected multi-polling receiving to always see the contents (list) of SEP data that has designated polling receiving, thereby preventing the operator from designating identical SEP data.

What is claimed is:

1. A data communication apparatus capable of multi-polling communication, which can perform polling receiving in which a plurality of SEP signals are designated in a communication process, comprising:

input means for inputting a plurality of SEP data for multi-polling receiving, wherein said input means can input a plurality of SEP data before beginning the communication process, and can add input SEP data during execution of polling receiving based on the input SEP data, and execute polling receiving based on the added SEP data.

2. An apparatus according to claim 1, wherein when input of SEP data is selected at the end of currently executed polling receiving, a call is released once, and then a call is made to the same destination to execute polling receiving.

3. An apparatus according to claim 1, wherein a plurality of SEP data designated during execution of multi-polling receiving are displayed, and information indicating selection of input of the same SEP data is displayed when input of the same SEP data is selected during the communication process.

4. An apparatus according to claim 2, wherein a plurality of SEP data designated during execution of multi-polling receiving are displayed, and information indicating selection of input of the same SEP data is displayed when input of the same SEP data is selected during the communication process.

5. A method for performing multi-polling communication, which can perform polling receiving in which a plurality of SEP signals are designated in a communication process, comprising the steps of:

inputting a plurality of SEP data before beginning the communication process;

adding input SEP data during execution of polling receiving based on the input SEP data; and executing polling receiving based on the added SEP data.

6. A method according to claim 5, further comprising a step of releasing a call once and then making a call to the same destination to execute polling receiving, when input of SEP data is selected at the end of currently executed polling receiving.

7. A method according to claim 5, further comprising a step of displaying a plurality of SEP data designated during execution of multi-polling receiving, and displaying information indicating selection of input of the same SEP data when input of the same SEP data when input of the same SEP data is selected during the communication process.

8. A method according to claim 6, further comprising a step of displaying a plurality of SEP data designated during execution of multi-polling receiving, and displaying information indicating selection of input of the same SEP data when input of the same SEP data is selected during the communication process.

9. Computer-executable process steps for performing multi-polling communication, which can perform polling receiving in which a plurality of SEP signals are designated in a communication process, comprising the steps of:

inputting a plurality of SEP data before beginning the communication process;

adding input SEP data during execution of polling receiving based on the input SEP data; and executing polling receiving based on the added SEP data.

10. Computer-executable process steps according to claim 9, further comprising a step of releasing a call once and then making a call to the same destination to execute polling receiving, when input of SEP data is selected at the end of currently executed polling receiving.

11. Computer-executable process steps according to claim 9, further comprising a step of displaying a plurality of SEP data designated during execution of multi-polling receiving, and displaying information indicating selection of input of the same SEP data when input of the same SEP data when input of the same SEP data is selected during the communication process.

12. Computer-executable process steps according to claim 10, further comprising a step of displaying a plurality of SEP data designated during execution of multi-polling receiving, and displaying information indicating selection of input of the same SEP data when input of the same SEP data is selected during the communication process.

13. A data communication apparatus capable of multi-polling communication, which can perform polling receiving in which a plurality of SEP signals are designated in a communication process, comprising.:

an SEP data input button that inputs a plurality of SEP data for multipolling receiving, wherein said SEP data input button can input a plurality of SEP data before beginning the communication process, and can add input SEP data during execution of polling receiving based on the input SEP data, and execute polling receiving based on the added SEP data.

14. An apparatus according to claim 13, wherein when input of SEP data is selected at the end of currently executed polling receiving, a call is released once, and then a call is made to the same destination to execute polling receiving.

15. An apparatus according to claim 13, wherein a plurality of SEP data designated during execution of multipolling receiving are displayed, and information indicating selection of input of the same SEP data is displayed when input of the same SEP data is selected during the communication process.

16. An apparatus according to claim 14, wherein a plurality of SEP data designated during execution of multi-polling receiving are displayed, and information indicating selection of input of the same SEP data is displayed when input of the same SEP data is selected during the communication process.

* * * * *

UNITED STATES PATENT AND TRADEMARK OFFICE
CERTIFICATE OF CORRECTION

PATENT NO. : 6,414,965 B1
DATED : July 2, 2002
INVENTOR(S) : Yoshida

It is certified that error appears in the above-identified patent and that said Letters Patent is hereby corrected as shown below:

Column 6,
Line 15, "when input of the same SEP data" should be deleted; and
Line 41, "when input of the same SEP data" should be deleted.

Signed and Sealed this

Eighteenth Day of May, 2004

JON W. DUDAS
*Acting Director of the United States Patent and Trademark Office*